United States Patent
Rueda

Patent Number: 6,157,727
Date of Patent: Dec. 5, 2000

[54] COMMUNICATION SYSTEM INCLUDING A HEARING AID AND A LANGUAGE TRANSLATION SYSTEM

[75] Inventor: Valentin Chapero Rueda, Erlangen, Germany

[73] Assignee: Siemens Audiologische Technik GmbH, Erlangen, Germany

[21] Appl. No.: 09/083,049

[22] Filed: May 22, 1998

[30] Foreign Application Priority Data

May 26, 1997 [DE] Germany ............................ 197 21 982

[51] Int. Cl.[7] .................................................. H04R 25/00
[52] U.S. Cl. .................. 381/312; 381/315; 381/23.1; 704/277
[58] Field of Search .................................. 381/23.1, 312, 381/313, 315, 316, 321, 323, 324, 322, 326, 328; 379/312, 314, 320, 321; 704/231, 8, 258, 270, 271, 277

[56] References Cited

U.S. PATENT DOCUMENTS

| | | | |
|---|---|---|---|
| 4,984,177 | 1/1991 | Rondel et al. ............................ | 704/277 |
| 5,425,104 | 6/1995 | Shennib .................................... | 381/326 |
| 5,615,301 | 3/1997 | Rivers ....................................... | 704/277 |
| 5,721,783 | 2/1998 | Anderson ................................. | 381/321 |
| 5,963,892 | 10/1999 | Tanaka et al. ........................... | 704/277 |

*Primary Examiner*—Duc Nguyen
*Assistant Examiner*—Suhan Ni
*Attorney, Agent, or Firm*—Hill & Simpson

[57] ABSTRACT

A communication system includes a hearing aid and a translation system connected by a communication path. The hearing aid has an input transducer and an output transducer with signal processing circuitry connected therebetween for acting on a signal emitted by the input transducer so as to provide a corrected signal to the output transducer, dependent on the hearing impairment of the hearing aid user. The translation system is in communication with the hearing aid via the communication path, and signals received by the input transducer in a first language can be supplied to the translation system wherein those signals are converted into speech signals in a second language, and are re-supplied to the hearing aid and are emitted at the hearing aid earphone in the second language.

8 Claims, 1 Drawing Sheet

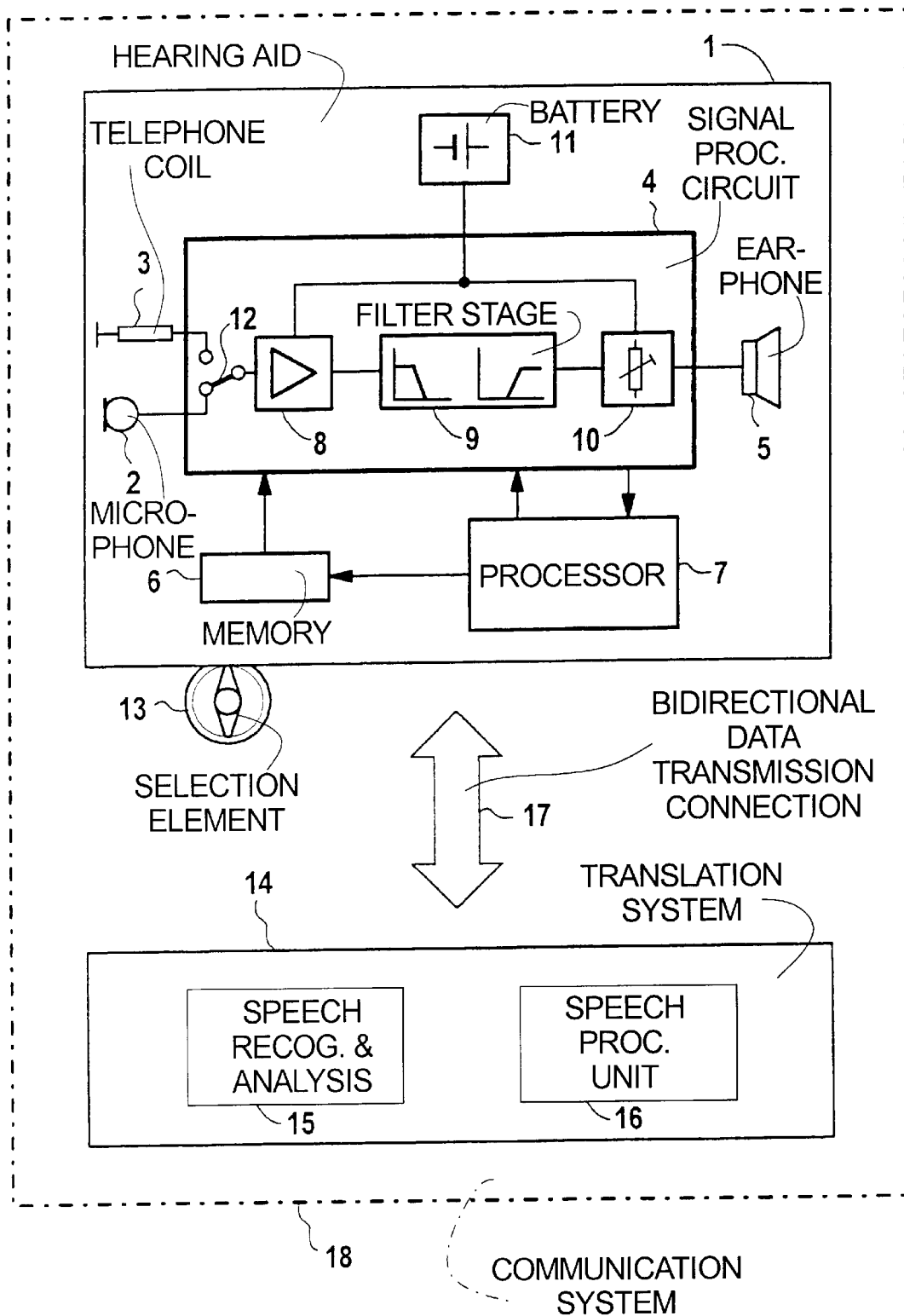

COMMUNICATION SYSTEM INCLUDING A HEARING AID AND A LANGUAGE TRANSLATION SYSTEM

BACKGROUND OF THE INVENTION

1. Field of the Invention

The present invention relates to a communication system for users of portable hearing aids of the type having at least a microphone and/or a telephone coil as an input transducer, an amplifier for amplifying the electrical signals of the input transducer, a signal processing circuit with memory, and an earpiece as an output transducer.

2. Description of the Prior Art

Hearing aids of this type are equipped with digital or analog signal processing circuitry. In digital hearing aids, there is a digital signal processor in which the signal processing takes place, using a digital signal processing program whose contents are loaded into the hearing aid. As a result, in a digital hearing aid, the details of the acoustical processing can be modified by modifying the program stored in the memory, and thus it is simple to perform an adjustment to optimize the speech intelligibility for an individual patient.

Specifically for telephone use, besides the microphone, hearing aids are equipped with a telephone coil or induction coil, as well as a change-over switch which must be operated to change from microphone mode to telephone coil mode. Because users of hearing aids have problems using mobile telephones, German Utility Model 29 608 340 teaches a communication system for hearing aid users for use in connection with a mobile telephone.

In order to simplify the handling of small hearing aid devices worn on the head, German OS 44 19 901, corresponding to U.S. Pat. No. 5,636,285, teaches a hearing aid device without manual engagement or means of activation. In this hearing aid device, the handling (switching on/off; setting louder/quieter; selecting a program which fits a hearing/environmental situation) or the control of a component which affects the transmission characteristic of the amplifier, occurs by recognition and evaluation of a code word spoken by the hearing aid user.

SUMMARY OF THE INVENTION

It is an object of the present invention to provide a communication system for a hearing aid user which affords the hearing aid user expanded modes of operation.

In the inventive communication system, therefore, in addition to correcting the speech signals dependent on the hearing impairment of the hearing aid user, the speech signals are translated into a language selected by the hearing aid user and the signals emitted by the earphone of the hearing aid are not only in a translated language, but also are corrected dependent on the hearing impairment of the hearing aid user so as to be understandable by the hearing aid user.

The above object is achieved in accordance with the principles of the present invention in a communication system including a hearing aid and a language translation system, and a communication arrangement for exchanging information between the hearing aid and the language translation system, wherein the language translation system transforms speech signals, in a first language, picked up by the input transducer into a selectable second language, and wherein the audio signals which are supplied to the user at an earphone of the hearing aid are in the selected, second language.

In an embodiment, compatibility between the hearing aid and the translation system is produced via at least one interface which matches the hearing aid signal processing circuit and a speech recognition and speech processing unit of a simultaneous translation system. The acoustical speech signals received by the input transducer (microphone or telephone coil) of the hearing aid are subsequently transduced into electrical signals and fed in an amplified state to the signal processing circuit. According to the embodiment, the useful electrical signals can undergo conventional signal processing known for hearing aids and can be fed to the output transducer or earpiece. Via interfaces between the signal processing circuit of the hearing aid, a bidirectional data transmission connection, and the translation system, a simultaneous translation of the speech signals into the speech signals of a selectable target language occurs, such that the speech signals which have been translated into the selected target language are delivered—via the earpiece—to the hearing aid wearer receiving speech signals of a foreign language.

If, in the production of the communication system, miniaturizable electronic components are available which are adequate particularly for the construction of the translation system, the hearing aid and the translation system can be combined into a portable unit which can be worn on the head or the body of the user.

In a further embodiment, the hearing aid is worn at the ear of the user (ITE or BTE), for example, while the translation system is carried on the body in a pouch or the like. Between the hearing aid and the translation system, interfaces are provided, for a data transmission—particularly a bidirectional transmission—so that the data transmission can ensue via a connection line.

Wireless data transmission, e.g. by infrared light, high-frequency radio waves, ultrasound or electrical induction can also be used for communication between the hearing aid and the translation system.

Particularly in meetings, training courses, presentations, etc., when a number of hearing aid wearers participate in a discussion, and the participants use various languages, it is advantageous if the hearing aids of the participants are compatible with a central translation system, and each participant can receive a translation in the selected target language via his or her hearing aid.

DESCRIPTION OF THE DRAWING

The single FIGURE is a block diagram of a communication system, including a hearing aid and a translation system, constructed and operating in accordance with the principles of the present invention.

DESCRIPTION OF THE PREFERRED EMBODIMENTS

The communications system 18 of the invention, depicted in a block diagram, includes a hearing aid 1 which can be worn by the user and a translation system 14 which is compatible therewith and which, according to the embodiment, is arranged in a stationary fashion and in data connection to the hearing aid. The translation system 14 alternatively can be worn by the user in combination with the hearing aid 1.

According to the exemplary embodiment, for picking up input signals, the hearing aid 1—for example a digital hearing aid—contains a microphone 2 as well as a telephone coil or induction coil 3; either the microphone or the induction coil can be switched to active mode via a function switch 12. The useful electrical signals delivered by the input transducer (microphone 2 or coil 3) are fed to a signal processing circuit 4. In the signal processing circuitry, the useful signals undergo are processed—via a preamplifier 8, a signal filter stage 9 and a switching stage 10 (volume controller), for example—and are emitted as acoustical signals to the ear of the hearing aid wearer via an earpiece 5. The hearing aid 1 is further equipped with a processor 7 and a memory 6. A battery 11, for example, serves for the power supply of the hearing aid.

By means of the communications system 18 of the invention, the hearing aid wearer can listen to—via the telephone coil 3—foreign-language telephone conversations, radio programs, or the like, and the system delivers to him or her a translation in a selectable target language. A selection element 13 is provided for choosing the desired target language and for activating the translation system 14.

The hearing aid 1 and the translation system 14 are constructed to be compatible via interfaces for data exchange, so that a bidirectional data transmission connection 17 is possible either wirelessly or via a connection line. The translation system 14 is of a known type, and, among other components, includes a speech recognition unit 15 for speech analysis of the incoming speech signals and a speech processing unit 16 for simultaneous translation into the selected target language.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A communication system comprising:
    a hearing aid adapted to be worn by a user having an input acousto-electrical transducer and an output electro-acoustical transducer, an amplifier for amplifying the electrical signals produced by said input transducer to produce amplified electrical signals, and signal processing means supplied with said amplified electrical signals for processing said amplified signals dependent on a hearing impairment of a user of said hearing aid, to produce processed electrical signals, said processed electrical signals being supplied to said output transducer;
    a language translation system which translates a first language into a second language; and
    information exchange means for coupling said hearing aid to said language translation system for causing audio signals received by said input transducer of said hearing aid in said first language to be supplied to said language translation system and translated therein and supplied from said translation system to said hearing aid for emission as audio signals to said user of said hearing aid in said second language via said output transducer.

2. A communication system as claimed in claim 1 wherein said hearing aid includes a hearing aid housing containing said input transducer, said amplifier, said signal processing means with memory and said ear piece, and wherein said translation system is contained in said hearing aid housing.

3. A communication system as claimed in claim 1 wherein said hearing aid comprises a hearing aid housing and wherein said translation system is disposed externally of said hearing aid housing, and wherein said information exchange means comprises means for wirelessly exchanging information between said hearing aid and said translation system.

4. A communication system as claimed in claim 1 wherein said hearing aid comprises a first portable unit wearable on a body of a user and wherein said translation system comprises a second portable unit wearable on a body of a user, and wherein said information exchange means comprises means for bidirectionally exchanging information between said hearing aid and said translation system and further comprises switching means for activating a communication path between said hearing aid and said translation system.

5. A communication system as claimed in claim 1 wherein said translation system comprises a simultaneous translation system having a speech recognition and speech processing unit, and wherein said information exchange means comprises an interface between said hearing aid and said speech recognition and speech processing unit.

6. A communication system as claimed in claim 1 further comprising a plurality of additional information exchange means and a plurality of additional hearing aids, each hearing aid being respectively connected to said translation system via respective information exchange means so that each hearing aid emits audio signals via its earphone in a second language.

7. A communication system as claimed in claim 6 wherein said translation means comprises means for translating said first language into a plurality of different second languages, and wherein each of said plurality of information exchange means comprises selection means for allowing a user to select one of said plurality of second languages as the second language to be received at the hearing aid connected to the respective information exchange means.

8. A communication system as claimed in claim 1 wherein said translation system comprises means for translating said first language into a plurality of second languages, and wherein said information exchange means comprises selection means for allowing a user of said hearing aid to select one of said second languages as said second language for the audio signals emitted by said earphone.

* * * * *